(12) United States Patent
Chaiko

(10) Patent No.: US 11,124,858 B2
(45) Date of Patent: Sep. 21, 2021

(54) SOLID-STATE CATALYSTS FOR LOW OR MODERATE TEMPERATURE LEACH APPLICATIONS AND METHODS THEREOF

(71) Applicant: FLSmidth A/S, Valby (DK)

(72) Inventor: David J. Chaiko, Quakake, PA (US)

(73) Assignee: FLSmidth A/S

( * ) Notice: Subject to any disclaimer, the term of this patent is extended or adjusted under 35 U.S.C. 154(b) by 0 days.

(21) Appl. No.: 17/272,437

(22) PCT Filed: Aug. 27, 2019

(86) PCT No.: PCT/IB2019/057219
§ 371 (c)(1),
(2) Date: Mar. 1, 2021

(87) PCT Pub. No.: WO2020/044241
PCT Pub. Date: Mar. 5, 2020

(65) Prior Publication Data
US 2021/0246526 A1    Aug. 12, 2021

Related U.S. Application Data

(60) Provisional application No. 62/723,372, filed on Aug. 27, 2018.

(51) Int. Cl.
*C22B 11/00* (2006.01)
*C22B 3/06* (2006.01)
*C22B 3/44* (2006.01)

(52) U.S. Cl.
CPC ............... *C22B 11/04* (2013.01); *C22B 3/06* (2013.01); *C22B 3/44* (2013.01)

(58) Field of Classification Search
CPC ............. C22B 11/04; C22B 3/06; C22B 3/44
(Continued)

(56) References Cited

U.S. PATENT DOCUMENTS 3,702,270 A    11/1972  Kawasaki et al.
4,378,275 A     3/1983  Adamson et al.
(Continued)

FOREIGN PATENT DOCUMENTS

JP        53127400 A   *  11/1978

OTHER PUBLICATIONS

International Search Report and Written Opinion (dated Feb. 7, 2020).
(Continued)

*Primary Examiner* — Melissa S Swain
(74) *Attorney, Agent, or Firm* — Jeffrey A. Sharp

(57) ABSTRACT

A method for removing sulfate iron-containing compounds from a low- to moderate-temperature metal sulfide leach circuit (1) is disclosed. A reactor (6) within a chloride leach circuit (5) and which is preferably maintained at a temperature between 20 and 150 degrees Celsius may be provided with a catalyst (4) comprising a material selected from the group consisting of: colloidal hematite, colloidal goethite, particulate containing FeOOH, particulate containing α-FeOOH, particulate containing γ-FeOOH, particulate containing $Fe_2O_3$, particulate containing α-$Fe_2O_3$, particulate containing γ-$Fe_2O_3$, particulate containing $Fe_3O_4$, particulate containing $Fe(OH)SO_4$, and a combination thereof. The catalyst (4) may also be used with heap leach and/or dump leach circuits (22), without limitation. Methods for using and generating the catalyst (4) are also disclosed. In some embodiments, the catalyst (4) may be used as an anti-frothing agent (e.g., for zinc leaching, without limitation).

18 Claims, 7 Drawing Sheets

(58) Field of Classification Search
USPC .......................................................... 75/744
See application file for complete search history.

(56) References Cited

U.S. PATENT DOCUMENTS

| | | | | |
|---|---|---|---|---|
| 4,902,344 | A | * | 2/1990 | Lucas ........................ C22B 3/10 |
| | | | | 423/38 |
| 2005/0118081 | A1 | * | 6/2005 | Harris ................. C22B 15/0069 |
| | | | | 423/22 |
| 2013/0209335 | A1 | | 8/2013 | Dixon et al. |

OTHER PUBLICATIONS

Dalton R. F. et al.: "The Cuprex Metal Extraction Process: Recovering Copper from Sulfide Ores", JOM: Journal of Metals, Springer New York LLC, United States, vol. 43, No. 8, Aug. 1, 1991 (Aug. 1, 1991), pp. 51-56, XP000261970, ISSN: 1047-4838.
Liddicoat et al: "Chloride Leaching of Chalcopyrite", Hydrometallurgy, Elsevier Scientific Publishing Cy. Amsterdam, NL, vol. 89, No. 3-4, Oct. 25, 2007 (Oct. 25, 2007), pp. 323-331, XP022314578, ISSN: 0304-386X, DOI: 10.1016/j.hydromet.2007.08.004.
H.R. Watling: "Chalcopyrite Hydrometallurgy at Atmospheric Pressure: 2. Review of acidic chloride process options", Hydrometallurgy., vol. 146,May 1, 2014 (May 1, 2014), pp. 96-110, XP055642910, NL ISSN: 0304-386X, DOI: 10.1016/j.hydromet.2014.03.013.

* cited by examiner

| Temp, °C | Catalyst Addition | % Total Sulfide Oxidation | % Sulfide Oxidation to Elemental Sulfur |
|---|---|---|---|
| 110 | Yes | 10.8 | 0.0 |
| 110 | No | 18.3 | 40.1 |
| 130 | Yes | 98.4 | 0.0 |
| 130 | No | 50.4 | 37.3 |

FIG. 5

| Test | Catalyst, ppm | $O_2$ Overpressure, psig | Fe(II), gpL | $pH_{initial}$ | Initial Fe(II) Oxidation Rate, g/L/min. |
|---|---|---|---|---|---|
| 1 | none | 455 | 92 | -0.35 | 0.098 |
| 2 | 10-100 | 220 | 31 | 0.27 | 2.9 |
| 3 | 800 | 220 | 77 | -0.47 | 3.3 |
| 4 | 400 | 220 | 77 | -0.48 | 3.6 |
| 5 | 88 | 220 | 74 | -0.39 | 2.9 |
| 6 | 25 | 220 | 74 | -0.39 | 2.8 |

FIG. 6

|  | % Solids | Particle Size, μm | Temp, °C | Residence Time, min. | Extraction % ||||| |
|---|---|---|---|---|---|---|---|---|---|---|
|  |  |  |  |  | Cu | As | Fe | Sb | Zn | Mole Ratio Cu/Fe |
| Invention | 10 | P80=86 P90=120 | 130 | 60 | 82 | 0.03 | 22.9 | 0 | 100 | 3.2 |
| CESL Process* (PRIOR ART) | 5 | P80=60 | 150 | 150 | 93.4 | 68.1 | 68.4 | 46.9 | 93 | 1.2 |
| Gibraltar** (PRIOR ART) | 10 | P90=38 | 130 | 180 | 43 | - | 50 | - | - | 0.8 |

\* Prada and Wilkomirsky "Pressure Leaching of a High Arsenic Copper Concentrate Under CESL Process Conditions," COM 2014 – Conference of Metallurgists Proceedings ISBN:978-1-926872-24-7

\*\* R. Hackl "The Leaching and Passivation of Chalcopyrite in Acid Sulfate Media," Ph.D. thesis, University of British Columbia, November 1995, p. 95

FIG. 7

|  | Leach Time, min. | Solids Composition, % | | | | | |
| --- | --- | --- | --- | --- | --- | --- | --- |
|  |  | Cu | Fe | $S_T$ | $S^{2-}$ | $S°$ | $S°$ Yield, % |
| Gibraltar* feed solids (P90=38) | - | 28.19 | 27.54 | 32.17 | 31.49 | 0.03 |  |
| Gibraltar* leach residue | 180 | 24.69 | 21.88 | 41.80 | 24.67 | 16.21 | 63 |
| Invention feed solids (P90=120) | - | 27.15 | 25.95 | 37.17 | 37.17 | 0.0 |  |
| Invention leach residue | 60 | 5.63 | 25.43 | 41.3 | 18.5 | 18.9 | 44 |

* R. Hackl, "The Leaching and Passivation of Chalcopyrite in Acid Sulfate Media," Ph.D. thesis, The University of British Columbia, November 1995, pp.94-95

FIG. 8

SOLID-STATE CATALYSTS FOR LOW OR MODERATE TEMPERATURE LEACH APPLICATIONS AND METHODS THEREOF

CROSS-REFERENCE TO RELATED APPLICATIONS

None.

FIELD OF THE INVENTION

Embodiments of the invention relate to hydrometallurgical processing and more particularly, to the use of solid-state catalysts in low- or moderate-temperature leach processes for recovering metal values from metal sulfides. The leach processes may comprise those of the heap/dump leach-type as well as pressure leach systems.

BACKGROUND

Low-temperature (e.g., less than 140 degrees Celsius), moderate-temperature (e.g., 140-180 degrees Celsius), and elevated temperature (e.g., greater than 180 degrees Celsius) leach processes are used in the processing of metal sulfide minerals. High-temperature leach processes are generally considered to operate at temperatures above 200 degrees Celsius. Refer to U.S. Pat. No. 7,041,152 for context.

In certain instances, as in the recovery of copper from copper bearing sulfide minerals, the conversion of sulfide to elemental sulfur has certain advantages as this favorably impacts oxygen consumption, heat balance, permits higher solid density within the reactor, and the amount of dilute acid that is produced.

Low-temperature processes (e.g., especially those which are less than 100 degrees Celsius) also tend to produce significant amounts of soluble iron. Both acid and soluble iron must be removed from process liquors via neutralization with limestone. However, this results in an accompanying production of copious volumes of gypsum and iron oxyhydroxides, which are difficult to filter. Unfortunately, the production of elemental sulfur, as a reaction product, can be problematic in precious metals processing and recovery.

Low-temperature processes operated below the melt temperature of sulfur (e.g., less than about 120 degrees Celsius), generally leads to surface passivation whereby the elemental sulfur reaction product coats reacting particles. This surface passivation adversely affects leach kinetics and hinders leaching of the reacting particles. If the leach reactor temperature is above about 120 degrees Celsius (e.g., which the approximate melting temperature of elemental sulfur) at any point during the leach process, the elemental sulfur will likely be in its melt state and will therefore lead to surface wetting and additional passivation of mineral surfaces, particle aggregation, reactor surface fouling, and unfavorable increases in slurry viscosity. Accordingly, there is a plethora of detrimental effects that can be found within both low- and moderate-temperature leach processes.

Past methods of addressing the aforementioned passivation problems have included the use of sulfur-dispersing surfactants. Past methods have also attempted to circumvent passivation problems by operating leach processes at temperatures greater than 200 degrees Celsius (i.e., at "high" leach temperatures), where sulfide is oxidized to sulfate and soluble iron is predominantly converted to hematite ($Fe_2O_3$).

Leaching processes which incorporate elemental sulfur dispersants, also have drawbacks. This is especially the case for downstream gold recovery. For example, during cyanide leach recovery of precious metals, dispersed elemental sulfur may coat gold-bearing particles within the cyanide leach and may also consume cyanide reagent—thereby reducing the total efficiency and performance of the cyanide leach.

The pre-oxidation of refractory gold concentrates at temperatures greater than 180 degrees Celsius (e.g., at "elevated" temperatures) uses high oxygen pressures to convert pyritic sulfide to sulfate. Under these reactor conditions, direct injection of oxygen accompanies significant heat production during the rapid oxidation of pyrite to yield dilute sulfuric acid (e.g., $\frac{1}{2}S_2^{2-} \rightarrow SO_4^{2-}$) and hematite (e.g., $Fe^{2+} \rightarrow \frac{1}{2}Fe_2O_3$). At atmospheric pressures, however, pyrite oxidation rates are significantly slower, and oxygen is insufficient as a sole oxidant source. The reaction rates between pyrite and $Fe^{3+}$ ions are generally an order of magnitude faster than the direct reaction of pyrite with molecular oxygen.

Thermodynamic phase diagrams indicate that reaction temperatures of about 80-100° C. and higher, under low pH conditions (e.g., less than 2.0), lead to the precipitation of ferric sulfate as jarosite (e.g., $Me^+Fe_3(SO_4)_2(OH)_6$, wherein $Me^+=H^+$, $K^+$, $Na^+$, etc.). This reaction effectively removes soluble $Fe^{3+}$ oxidant from solution. Unfortunately, jarosites are not reactive as an electron transfer participant due to the presence of non-labile ligands on each Fe(III) ion. The non-labile ligand association with Fe(III) prevents electron orbital overlap between reductant ($FeS_2$) and oxidant ($Fe^{3+}$), thereby inhibiting any possibility of electron transfer between jarosite and reductants such as ZnS, PbS, $FeS_2$, FeAsS, $CuFeS_2$, $Cu_3AsS_4$, $H_3AsO_3$, and/or the like.

Examples of prior art leaching processes which have attempted to address these issues can be seen in U.S. Pat. Nos. 6,676,909, 7,041,152, and 5,874,055.

OBJECTS OF THE INVENTION

Embodiments of the invention aim to overcome or circumvent the aforementioned problems associated with conventional leach processing of metal sulfides. In particular, it is desired that embodiments of the invention provide a leaching system and method that is capable of eliminating or significantly reducing the conversion of sulfide to elemental sulfur.

It is further desired that embodiments of the invention provide a method of reducing, eliminating, and/or preventing the formation of elemental sulfur during the leaching of mineral sulfides, for example, during pre-oxidative treatment of refractory gold ores and concentrates thereof, where contained sulfide may be converted to sulfate.

It is also desired that embodiments of the invention reduce or eliminate the amount of elemental sulfur in the leach product, in order to improve the efficiency of downstream cyanide leaching and the recovery of precious metals from leach residues.

It is further desired that embodiments of the invention improve a downstream cyanide leach process for recovering precious metals from a leach residue, by reducing or substantially eliminating the amount of potential consumers of cyanide (e.g., elemental sulfur) which can be introduced to a downstream cyanide leach circuit.

It is also desired that embodiments of the invention provide one or more solid-state catalysts which might encourage efficient operation and improved performance of pressure leach systems at considerably lower temperatures and pressures, while maintaining or exceeding oxidation performance typical of current elevated and/or high-temperature leaching processes (e.g., state-of-the-art processes operating between 150 and 230 degrees Celsius, without limitation).

It is further desired that embodiments of the invention provide a mechanism to achieve high oxidation rates and rapid conversion of As(III) to As(V).

It is further desired that embodiments of the invention provide a mechanism to achieve high oxidation rates and rapid conversion of sulfide to sulfate.

It is a further objective that embodiments of the present invention provide a way to achieve rapid conversion of ferrous (i.e., iron (II), $Fe^{2+}$) to ferric (i.e., iron (III), $Fe^{3+}$).

It is yet another objective to identify and employ one or more improved catalysts comprising materials which provide iron-accessible electron orbitals that are configured to participate in electron transfer.

It is further desired that embodiments of the invention provide a catalyst which outperforms jarosite (which has no labile ligand association with Fe(III)).

It is yet another objective to identify and employ catalysts which comprise materials that are configured to sufficiently catalyze the oxidation of Fe(II) to Fe(III) in sulfate and chloride lixiviants via Fe(II) surface cluster formation and subsequent reaction with molecular oxygen.

A further objective is to employ a catalyst that will sufficiently catalyze the oxidation of sulfide to sulfate whilst minimizing or completely eliminating side reactions that yield elemental sulfur.

It is further desired that embodiments of the invention provide a catalyst which promotes mineral sulfide oxidation in heap leach systems at temperatures between 50 and 100 degrees Celsius, without limitation.

Other goals of the invention may include, but are not limited to: enhancing reaction rates, enabling the treatment of coarser solid feed particles, achieving adequate catalysis of oxidation of Fe(II) to Fe(III) and As(III) to As(V) in sulfate/chloride/mixed sulfate-chloride systems; achieving adequate promotion of sulfide to sulfate conversion; eliminating or substantially reducing the production of elemental sulfur during low- to moderate-temperature pressure leaching, column leaching, and/or heap leaching; increasing cyanide leach efficiency during precious metals recovery, reducing undesirable side reactions between elemental sulfur and cyanide during precious metals recovery, and/or enhancing leach rates of refractory metal sulfides, without limitation.

These and other objects of the present invention will be apparent from the drawings and description herein. Although every object of the invention is believed to be attained by at least one embodiment of the invention, there is not necessarily any one single embodiment of the invention that achieves all of the objects of the invention.

BRIEF SUMMARY OF THE INVENTION

Disclosed, is a catalyst for use in processes for leaching metal sulfides (in particular, processes which operate at or below 150 degrees Celsius). According to some embodiments, the catalyst may comprise a material such as colloidal hematite, colloidal goethite, particulate containing FeOOH, particulate containing $Fe_2O_3$ [e.g., $\alpha$-$Fe_2O_3$ (hematite) and/or $\gamma$-$Fe_2O_3$ (maghemite)], particulate containing $Fe_3O_4$, particulate containing $Fe(OH)SO_4$, or any combination thereof, in any ratio, without limitation.

In some instances, the catalyst may comprise a particle or particulate containing FeOOH (e.g., $\alpha$-FeOOH (goethite) and/or $\gamma$-FeOOH (lepidocrocite)), without limitation. In some instances, the catalyst may comprise a particle or particulate containing $Fe_2O_3$ (e.g., $\alpha$-$Fe_2O_3$ and/or $\gamma$-$Fe_2O_3$), without limitation. In some instances, the catalyst may comprise a particle or particulate containing $Fe_3O_4$, without limitation. In some instances, the catalyst may comprise a particle or particulate containing $Fe(OH)SO_4$, without limitation. And, in some non-limiting embodiments, the catalyst may comprise a particle or particulate containing a combination of the above-listed materials, without limitation.

The catalyst may be a solid-state catalyst, and it may be introduced to a sulfide leach system in various amounts from 10 PPM to 20 wt. % of a solids feed to the sulfide leach system, without limitation. The catalyst may be homogenously mixed throughout a reactor and/or pressure vessel, or, in some embodiments, it may be deployed as a supported catalyst (e.g., porous or non-porous coatings or films on components of a reactor and/or pressure vessel such as on internal reactor walls, mixing impellers, baffles, discs, shafts, and/or the like, without limitation). Supported catalysts may also be suspended coated surfaces which are provided to components of a reactor or pressure vessel. It is further envisaged that according to some embodiments, a catalyst may be provided in the form of substrate-supported coatings, without limitation. For example, colloidal catalyst material may be provided to particles to improve delivery. The catalyst may be employed and used as an anti-froth agent for a sub-150 degree Celsius process for leaching a metal sulfide.

A catalyst 4 for use in a metal sulfide leaching circuit 1 is disclosed, wherein the metal sulfide leaching circuit 1 may comprise a reactor 6 within a chloride leach circuit 5, a pressure vessel 12 downstream of the reactor 6, and an upstream solid/liquid separation device 8 being located between the reactor 6 and the pressure vessel 12. The upstream solid/liquid separation device 8 may be configured for dewatering leach residue 7 from the chloride leach circuit 5, without limitation. The metal sulfide leaching circuit 1 may also comprise a downstream solid/liquid separation device 14 being located downstream of the pressure vessel 12. The device 14 may be configured for removing iron and sulfur-containing solids from product 13 leaving the pressure vessel 12. The metal sulfide leaching circuit 1 may also comprise a catalyst 4 being provided to the reactor 6 and comprising a material selected from the group consisting of: colloidal hematite, colloidal goethite, particulate containing FeOOH, particulate containing $\alpha$-FeOOH, particulate containing $\gamma$-FeOOH, particulate containing $Fe_2O_3$, particulate containing $\alpha$-$Fe_2O_3$, particulate containing $\gamma$-$Fe_2O_3$, particulate containing $Fe_3O_4$, particulate containing $Fe(OH)SO_4$, and a combination thereof.

The catalyst 4 may be a solid-state catalyst. In some embodiments, the material of the catalyst 4 may be doped with $Al^{3+}$, $Ti^{3+}$, or a combination thereof, without limitation. In some embodiments, the catalyst 4 may be colloidal and may be supported by a particle or particulate. In some embodiments, the catalyst 4 may be bound to a surface of a component within the reactor 6 and/or the pressure vessel 12 such that the catalyst 4 forms a porous or non-porous film or coating on a surface of a component within the reactor 6 and/or the pressure vessel 12. In some embodiments, the pressure vessel 12 may be maintained between 1 and 15 bar.

The reactor 6 may comprise a conventional stirred tank reactor, a column reactor, or an autoclave, without limitation. The reactor 6 may be maintained at a temperature between 20 and 150 degrees Celsius. For example, the reactor 6 may be maintained at a temperature between 20 and 100 degrees Celsius if the reactor 6 is unpressurized. As another example, the reactor 6 may be maintained at a temperature between 40 and 150 degrees Celsius if the reactor 6 is pressurized. The pressure vessel 12 may maintained at a temperature between 20 and 150 degrees Celsius. For example, the pressure vessel 12 may be maintained at a temperature between 40 and 80 degrees Celsius, without limitation.

A method for removing a sulfate iron-containing compound from a metal sulfide leaching circuit 1 is also disclosed. The method may comprise one or more of the following steps: providing a reactor 6 within a chloride leach circuit 5; providing a pressure vessel 12 downstream of the reactor 6; providing an upstream solid/liquid separation device 8 between the reactor 6 and the pressure vessel 12; providing a solids feed 2 containing metal sulfide particles to the reactor 6; leaching the metal sulfide particles in the reactor 6; dewatering leach residue 7 leaving the chloride leach circuit 5 using the upstream solid/liquid separation device 8; providing a downstream solid/liquid separation device 14 downstream of the pressure vessel 12 for receiving product 13 leaving the pressure vessel 12; precipitating a sulfate iron-containing compound out of solution in the pressure vessel 12; removing said sulfate iron-containing compound using the downstream solid/liquid separation device 14; providing a catalyst 4 comprising a material selected from the group consisting of: colloidal hematite, colloidal goethite, particulate containing FeOOH, particulate containing $\alpha$-FeOOH, particulate containing $\gamma$-FeOOH, particulate containing $Fe_2O_3$, particulate containing $\alpha$-$Fe_2O_3$, particulate containing $\gamma$-$Fe_2O_3$, particulate containing $Fe_3O_4$, particulate containing $Fe(OH)SO_4$, and a combination thereof; providing the catalyst 4 to the reactor 6; optionally providing the catalyst 4 to the pressure vessel 12.

The method may further comprise maintaining the reactor 6 at a temperature between 20 and 150 degrees Celsius. The method may further comprise maintaining the reactor 6 at a temperature between 20 and 100 degrees Celsius and maintaining the reactor 6 at atmospheric pressure. The method may further comprise maintaining the reactor 6 at a temperature between 40 and 150 degrees Celsius and maintaining the reactor 6 at above-atmospheric pressure. In some embodiments, the catalyst 4 may be a solid-state catalyst. In some embodiments, the metal sulfide particles of the solids feed 2 may comprise pyrite, pyrrhotite, and/or marcasite.

The method may further comprise delivering a liquids fraction 16 from the downstream solid/liquid separation device 14 to the reactor 6; wherein the liquids fraction 16 may comprise a chloride salt solution comprising ferric chloride. The method may further comprise leaching a solids fraction 9 of the leach residue 7 from the chloride leach circuit 5, in a cyanide leach circuit 10, to recover a precious metal therefrom. In some embodiments, the precious metal may be selected from the group consisting of: gold, silver, a platinum group metal, and a combination thereof, without limitation. The method may further comprise delivering a liquids fraction 11 of the leach residue 7 from the chloride leach circuit 5, to the pressurized vessel 12. The method may further comprise maintaining the pressurized vessel 12 at a pressure between 1 and 15 bar. The method may further comprise the step of doping material of the catalyst 4 with $Al^{3+}$, $Ti^{3+}$, or a combination thereof. In some embodiments, the catalyst 4 may be colloidal and the method may comprise supporting the material of the catalyst 4 on a particle or particulate, for example, to improve delivery to a reactor 6, without limitation. The method may further comprise binding the catalyst 4 to a surface of a component within the reactor 6 and/or the pressure vessel 12; or forming a porous or non-porous film or coating comprising the catalyst 4 on a surface of a component within the reactor 6 and/or the pressure vessel 12.

The method may further comprise promoting high oxidation and promoting one of the following in the reactor 6: rapid conversion of sulfide to sulfate; rapid conversion of arsenic III to arsenic V. The method may further comprise promoting rapid conversion of ferrous to ferric in the pressure vessel 12. The method may further comprise mitigating froth formation in the leach reactor 6 by virtue of the steps of: providing the catalyst 4 to the reactor 6 and optionally providing the catalyst 4 to the pressure vessel 12. In some embodiments, the metal sulfide particles in the solids feed 2 may comprise sphalerite, and the method may comprise leaching zinc (Zn) into solution in the reactor 6.

A metal sulfide leaching circuit 1 according to embodiments of the invention may comprise a reactor 6 within a chloride leach circuit 5, the reactor 6 being fed with a solids feed 2 comprising metal sulfide particles. The circuit 1 may further comprise a pressure vessel 12 downstream of the reactor 6 which is maintained at a pressure between 1 and 15 bar and a temperature between 20 and 150 degrees Celsius. The circuit 1 may further comprise an upstream solid/liquid separation device 8 being located between the reactor 6 and the pressure vessel 12. The upstream solid/liquid separation device 8 may be configured for dewatering leach residue 7 from the chloride leach circuit 5. The circuit 1 may further comprise a downstream solid/liquid separation device 14 being located downstream of the pressure vessel 12 for removing one or more sulfate iron-containing compounds from product 13 of the pressure vessel 12. The circuit may further comprise a catalyst 4 comprising a material selected from the group consisting of: colloidal hematite, colloidal goethite, particulate containing FeOOH, particulate containing $\alpha$-FeOOH, particulate containing $\gamma$-FeOOH, particulate containing $Fe_2O_3$, particulate containing $\alpha$-$Fe_2O_3$, particulate containing $\gamma$-$Fe_2O_3$, particulate containing $Fe_3O_4$, particulate containing $Fe(OH)SO_4$, and a combination thereof.

In some embodiments, the catalyst 4 may be a solid-state catalyst. In some embodiments, the metal sulfide particles of the solids feed 2 feeding the reactor 6 may comprise pyrite, pyrrhotite, and/or marcasite, without limitation. The metal sulfide leaching circuit 1 may comprise a cyanide leach circuit 10 downstream of the upstream solid/liquid separation device 8. The cyanide leach circuit 10 may be configured to receive a solids fraction 9 of the leach residue 7 from the chloride leach circuit 5, and recover a precious metal therefrom. The precious metal is selected from the group consisting of: gold, silver, a platinum group metal, and a combination thereof, without limitation.

In some preferred embodiments, the pressurized vessel 12 may receive a liquids fraction 11 of the leach residue 7 from the chloride leach circuit 5. In some preferred embodiments, the pressure vessel 12 may be configured to promote a rapid conversion of ferrous to ferric. In some preferred embodiments, the leach reactor 6 may be configured to promote high oxidation and one of the following: rapid conversion of sulfide to sulfate; rapid conversion of arsenic III to arsenic V.

An anti-frothing agent for use in a metal sulfide leaching circuit 1 or process is further disclosed. The anti-frothing agent may be configured to minimize oxidation of sulfide to elemental sulfur and/or maximize oxidation of sulfide to sulfate. The anti-frothing agent may consist essentially of a material selected from the group consisting of: colloidal hematite, colloidal goethite, particulate containing FeOOH, particulate containing $\alpha$-FeOOH, particulate containing γ-FeOOH, particulate containing $Fe_2O_3$, particulate containing α-$Fe_2O_3$, particulate containing γ-$Fe_2O_3$, particulate containing $Fe_3O_4$, particulate containing $Fe(OH)SO_4$, and a combination thereof. The metal sulfide leaching circuit 1 or process in which the anti-frothing agent is used may comprise zinc dissolution and a solids feed 2 which comprises sphalerite, without limitation.

According to some embodiments, a method may be practiced by performing one or more of the following steps: providing a metal sulfide leach circuit 1 operating at a temperature less than 150 degrees Celsius; providing a pressure leach circuit 3 operating above 200 degrees Celsius and at a pressure between 1 and 15 bar, wherein the pressure leach circuit 3 comprises a reactor 6; producing a catalyst 4 in the reactor 6 of the pressure leach circuit 3; separating leach residue 7 leaving the reactor 6 into a solids fraction 9 and a liquids fraction 11; subjecting the liquids fraction 11 to froth flotation in at least one flotation cell 19; harvesting the produced catalyst 4 by collecting froth produced by the at least one flotation cell 19; and deploying the catalyst 4 to the leach circuit 3.

According to some embodiments, the reactor 6 of the pressure leach circuit 3 may comprise an autoclave, without limitation. According to some embodiments, the metal sulfide leach circuit 1 may comprise a sulfide heap leach or a sulfide dump leach 22. According to some embodiments, the metal sulfide leach circuit 1 may comprise a reactor 6. According to some embodiments, the reactor 6 may comprise a stirred tank reactor, a column reactor, or an autoclave, without limitation.

A metal sulfide leaching circuit 1 comprising a sulfide heap leach or a sulfide dump leach 22 is further disclosed. The sulfide heap leach or a sulfide dump leach 22 may be fed with a solids feed 2 comprising metal sulfide particles, without limitation. A pressure vessel 12 may be provided downstream of the sulfide heap leach or a sulfide dump leach 22 and may be maintained at a pressure between 1 and 15 bar and at a temperature between 20 and 150 degrees Celsius, without limitation. The pressure vessel 12 may receive pregnant leach solution 23 from the sulfide heap leach or a sulfide dump leach 22. The The metal sulfide leaching circuit 1 may further comprise a downstream solid/liquid separation device 14 located downstream of the pressure vessel 12 for removing one or more sulfate iron-containing compounds from product 13 leaving the pressure vessel 12. The metal sulfide leaching circuit 1 may further comprise a catalyst 4 comprising a material selected from the group consisting of: colloidal hematite, colloidal goethite, particulate containing FeOOH, particulate containing α-FeOOH, particulate containing γ-FeOOH, particulate containing $Fe_2O_3$, particulate containing α-$Fe_2O_3$, particulate containing γ-$Fe_2O_3$, particulate containing $Fe_3O_4$, particulate containing $Fe(OH)SO_4$, and a combination thereof. The catalyst 4 may be delivered to the sulfide heap leach or sulfide dump leach 22 and may optionally be delivered to the pressure vessel 12. The catalyst (4) may be a solid-state catalyst. The pressure vessel 12 may be configured to promote a rapid conversion of ferrous to ferric.

In some embodiments, a system, process, and/or method may be provided as substantially shown and described in FIG. 1, 2, 3, or 4. In some embodiments, a system, process, and/or method may be substantially configured to produce the results depicted in any one of tables shown in FIGS. 5-8, without limitation.

Further details may be appreciated from the below detailed description, appended drawings, and claims.

BRIEF DESCRIPTION OF THE DRAWINGS

To complement the description which is being made, and for the purpose of aiding to better understand the features of the invention, drawings illustrating exemplary, non-limiting embodiments have been added to the present specification as an integral part thereof, in which the following have been depicted with an illustrative and non-limiting character. It should be understood that like reference numbers used in the drawings (if any are used) may identify like components. In the drawings:

FIG. 5 is a table corresponding to EXAMPLE 1, which suggests that the addition of a catalyst according to non-limiting exemplary embodiments of the invention can result in much higher total percent sulfide oxidation whilst keeping the production of elemental sulfur reaction products from oxidation to below detection levels. FIG. 5 further suggests that unlike the control test results, the addition of a catalyst according to non-limiting exemplary embodiments of the invention can result in barely detectable amounts of elemental sulfur reaction products.

FIG. 6 is a table which corresponds to EXAMPLE 2, showing various data from six different oxidation tests which were performed in accordance with embodiments of the inventive system and method described herein.

FIG. 7 is a table which corresponds to EXAMPLE 3 and suggests that the addition of a catalyst according to non-limiting exemplary embodiments of the invention can result in barely detectable dissolution of arsenic and antimony, as well as high copper-to-iron extraction ratios and adequate copper extraction %—despite both low residence times (e.g., 1-hour leach time) and unconventionally large particle sizes (e.g., a P80 of 86 μm and a P90 of 120 μm). As shown, lower-than-conventional amounts of iron may be leached into solution as well, despite short leach times (e.g., 1 hour) and more than three times (3×) conventional average feed solids particle sizes.

FIG. 8 corresponds to the COMPARITIVE EXAMPLE. The table suggests that there are lower elemental sulfur yields in leach residue when practicing the inventive concepts disclosed herein. FIG. 8 further suggests that embodiments of the invention are capable of higher copper leach rates (with nearly five times (5×) less copper wasted in leach residue), without limitation.

Figure 1:
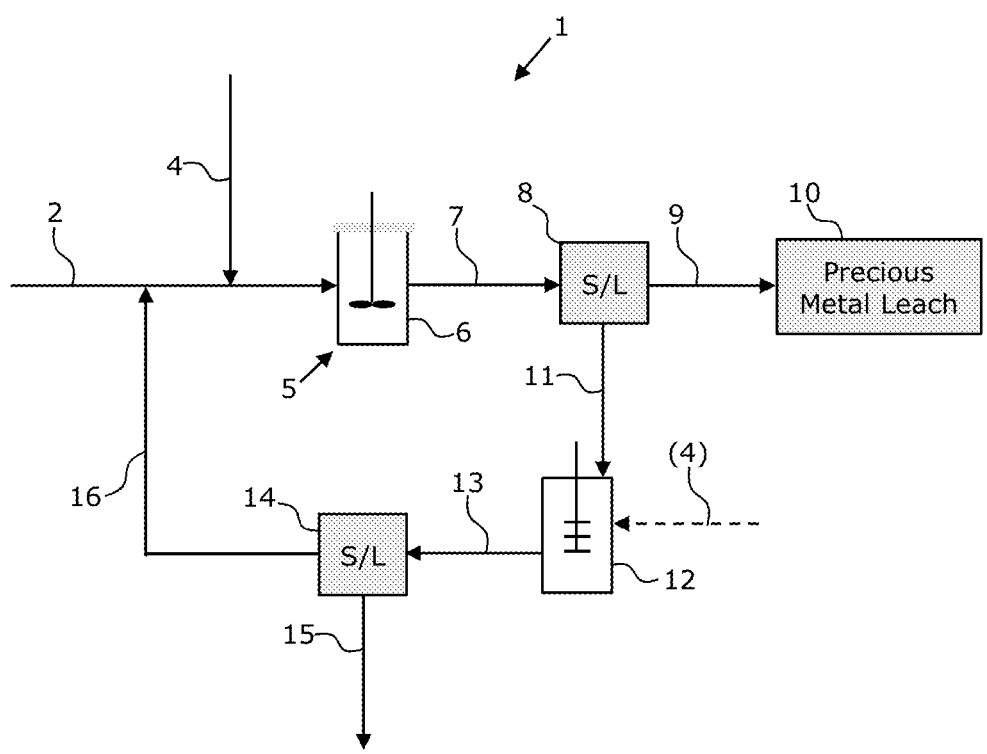
FIG. 1 suggests a system and method according to some embodiments, wherein a catalyst 4 is introduced to a low- to moderate-temperature metal sulfide leach circuit 1. Leach residue 7 from a chloride leach 5 undergoes solid-liquid separation 8, wherein the solids 9 move on to a downstream cyanide leach circuit 10 for recovery of precious metals, and the liquids 11 move to a pressurized vessel 12 maintained at a temperature (e.g., 20-150 degrees Celsius, and more preferably between 40 and 80 degrees Celsius) sufficient to cause the precipitation of ferric-sulfate compounds at an oxygen over pressure below 15 bar. Another solid-liquid separation 14 occurs downstream of the pressure vessel 12 to remove precipitated sulfate iron-containing compounds 15 from the circuit 1 in various forms (e.g., basic iron sulfate, various forms of jarosite (i.e., $M^+Fe_3(OH)_6(SO_4)_2$) where $M^+$ is any suitable cation such as $H^+$, $Na^+$, $K^+$). $FeCl_3$ and chloride remaining in solution 16 is recycled back to the chloride leach 5.

In the following, the invention will be described in more detail with reference to drawings in conjunction with exemplary embodiments.

DETAILED DESCRIPTION OF THE INVENTION

The following description of the non-limiting embodiments shown in the drawings is merely exemplary in nature and is in no way intended to limit the inventions disclosed herein, their applications, or their uses.

Disclosed herein, are embodiments of a system and method for leaching a metal sulfide. According to some embodiments, a catalyst 4 is provided and used in a sulfate and chloride leach circuit 5 within a low- to moderate-temperature metal sulfide leach circuit 1. The catalyst 4 comprises a material selected from the group consisting of: colloidal hematite, colloidal goethite, particulate containing FeOOH (e.g., α-FeOOH and/or γ-FeOOH), particulate containing $Fe_2O_3$ (e.g., α-$Fe_2O_3$ and/or γ-$Fe_2O_3$), particulate containing $Fe_3O_4$, particulate containing $Fe(OH)SO_4$, and a combination thereof.

The catalyst 4 preferably comprises ferric-containing particulates which may be chemical compounds, minerals, or a combination thereof, without limitation. The catalyst 4 may be distinguished by the presence of surface-located ferric species having labile ligands which are configured such that the frontier electron-orbitals of its atoms are accessible for chemical reaction, and more specifically, for electron transfer reactions. The catalyst 4 may be a solid-state catalyst, without limitation.

Embodiments of the catalyst 4 may be used in particulate form or, they may be deployed in a supported solid-state form, without limitation. For example, catalyst 4 delivery to a reactor 6 or heap or dump leach 22 may be made possible by particles supporting the catalyst. The catalyst 4 may also be deployed via coatings or films on surfaces of components within a reactor 6 or pressure vessel 12, without limitation.

Moreover, embodiments of the catalysts 4 described herein may contain dopants known to those skilled in the art, for purposes of improving electronic conduction, manipulation of band gap energy, altering semiconducting properties between n-type to p-type, enhancing photo-activity, and the like, without limitation—all with the aim of enhancing the catalytic behavior of the catalyst 4 towards metal sulfide oxidation, improving physical properties like strength, surface area, surface charge, isoelectric point and the like, without limitation.

The oxidation of sulfide minerals is known to proceed through electrochemical reactions between a mineral surface and soluble ferric. An issue with low-temperature (e.g., 100-140 degrees Celsius) pressure oxidation systems at low pH (e.g., less than 2) is the inherent instability of ferric ion when in the presence of sulfate. Soluble ferric tends to react with sulfate to form jarosite. This iron-containing compound (i.e., jarosite) lacks the presence of a labile ligand on its Fe(III) atoms, thereby preventing the iron from participating in electron transfer reactions and acting as an oxidant. However, the inventive concept of seeding a reactor 6 and/or a pressure vessel 12 with particulate iron compounds such as basic iron sulfate, goethite, hematite, and magnetite provides reactive iron-containing surfaces which can take part in electron transfer reactions due to the presence of labile ligands on the ferric surface atoms. Accordingly, the provision and use of the prescribed catalyst 4 within a reactor 6 of a chloride leach 5 is proposed in this application for patent, wherein the catalyst 4 may be a solid-state catalyst. In some non-limiting embodiments, a solid-state catalyst 4 may be doped with other atoms (e.g., $Al^{+3}$, $Ti^{+3}$, or a combination thereof), in order to enhance the semiconductor properties of the catalyst 4, without limitation.

A particulate iron-containing catalyst 4 according to some embodiments of the present invention may provide catalytic sites which can promote the oxidation of ferrous to ferric by enabling the 4-electron transfer reaction between adsorbed Fe(II) surface species and molecular oxygen, without limitation. The Fe(III)-containing catalyst 4 preferably has accessible electron orbitals with similar symmetry to the reductant to enable proper orbital overlap and initiation of electron transfer from the reductant to the oxidant (e.g., π to π or σ to σ, but not π to σ as with linear structures like pyrite).

Embodiments of the system and method may involve employing a catalyst 4 which sufficiently catalyzes the oxidation of Fe(II) to Fe(III) in sulfate and chloride lixiviants via Fe(II) surface cluster formation. Embodiments of the catalyst 4 described herein may also be used to sufficiently catalyze the oxidation of sulfide to sulfate and/or minimize or completely eliminate side reactions that yield passivating formations of elemental sulfur.

The potential advantages of the system and method disclosed herein are several fold. Enhanced reaction rates may be achieved—even for those solids feeds having coarser feed particles. Secondly, catalysis of oxidation of Fe(II) to Fe(III) in sulfate/chloride/mixed sulfate-chloride systems may also be achieved. Thirdly, the production of elemental sulfur during low—(e.g., 1-7 bar) to moderate—(e.g., 7-15 bar) pressure leach systems may be eliminated or at least substantially reduced. Fourthly, the production of elemental sulfur in low pH (e.g., between 0.5 and 2) leach systems operating between 20 and 150 degrees Celsius) may be eliminated or at least substantially reduced.

Additionally, cyanide leach efficiency (during recovery of precious metals from sulfide leach residue) may be increased due to reduced side reactions between elemental sulfur (a cyanide consumer) and cyanide. Additionally, oxidation of As(III) to As(V) may be achieved more efficiently. Moreover, the leach rates of refractory metal sulfides may be enhanced, without limitation.

Turning now to FIG. 1, a novel system and method for reduced temperature leaching of metal sulfides is shown.

The system and method begins with the introduction of a solids feed 2 containing metal-bearing sulfide particles to a low- to moderate-temperature metal sulfide leach circuit 1. The solids feed 2 may comprise a concentrate comprising metal sulfide particles. The metal sulfide may be refractory or double refractory, and may contain gold (Au), silver (Ag) and arsenic (As), without limitation. The metal sulfide particles may comprise pyrite, pyrrhotite, or marcasite, without limitation. In some embodiments, the metal sulfide particles may comprise sphalerite, wherein zinc dissolution may occur in reactor 6. Particulates in the solids feed 2 may comprise a P80 between 5 μm and 200 μm and a P90 between 50 μm and 500 μm, without limitation. As shown in the figure, the solids feed 2 may be delivered to a reactor 6 in a chloride leach circuit 5. The chloride leach circuit 5 may comprise sulfate, without limitation.

In addition to the solids feed 2, a catalyst 4 is provided fed to a reactor 6 in the chloride leach circuit 5, as shown. The catalyst 4 may range from about 10 ppm to as much as about 20 wt. % of the solids feed 2, without limitation. For example, amounts in the 100 ppm to 5 wt. % of the catalyst 4 may be expected or found to be practical. The solids feed 2 may comprise pyrite ($FeS_2$) that finds its way to the chloride leach circuit 5 with the catalyst 6, without limitation.

The reactor 6 may be an atmospheric vessel exposed to ambient pressure conditions, but it is preferably able to maintain at least small (e.g., 1-7 bar) and/or moderate (e.g., up to 15 bar) amounts of pressure. As suggested in the following examples, reactor 6 may be configured to operate at an oxygen overpressure of 25 to 100 psig, without limitation. For example, the reactor 6 may, in some embodiments, be configured to operate at an oxygen overpressure of about 5 bar (approximately 73 psig) or the like, without limitation.

The reactor 6 preferably comprises means for agitation, and may be provided as a stirred tank reactor or industrial mixer, without limitation. The reactor 6 may comprise any agitation means known in the art, including, but not limited to, a rotating shaft and stirrer, impeller, or other mechanical device attached thereto which is configured to impart motion and/or turbulence to a slurry. In some embodiments, the reactor 6 may comprise a column reactor, a mixer, or an autoclave, without limitation. The reactor 6 may also comprise grinding media comprising a material selected from the group consisting of: ceramic, polymer, metal, or a combination thereof.

In some preferred embodiments, the reactor 6 may be configured to be maintained at a temperature between 20 and 100 degrees Celsius when operating at atmospheric pressure (i.e., during unpressurized operation of reactor 6). In some embodiments, the reactor 6 may be configured to be maintained at a temperature above 40 or 50 degrees Celsius, and more preferably configured to be maintained at a temperature above 80 degrees Celsius (e.g., between 100 and 150 degrees Celsius) when operating at above-atmospheric pressures (i.e., in a pressurized regime).

Leach residue 7 from the chloride leach circuit 5 (e.g., leaving the reactor 6) may head to an upstream solid-liquid separation device 8 where a solids fraction 9 of the leach residue 7 may be separated from a liquids fraction 11 of the leach residue 7. This separation may be performed using any conventional means known in the art including, but not limited to, centrifugal separation, gravity settling, filtration, sedimentation, thickening, decanting, screening, or the like, without limitation.

The solids fraction 9 of the leach residue 7 may feed a cyanide leach circuit 10 after appropriate pH adjustment (e.g., for recovering gold and/or other precious metals therefrom). The solids fraction 9 is characterized in that it may generally contain less elemental sulfur than leach residue of other prior low-temperature pressure leach processes for metal sulfides. In some instances, elemental sulfur contained within the solids fraction 9 may be expected to be below detection limits by X-ray diffraction, thereby mitigating the risk of undue cyanide consumption and mineral surface passivation during the cyanide leach 10. The liquids fraction 11 of the leach residue 7 may enter a pressure vessel 12 which is located downstream of the upstream solid-liquid separation device 8, and also located upstream from a downstream solid-liquid separation device 14.

The pressure vessel 12, like the reactor 6, may be provided with a mechanical agitator, such as a stirring mechanism or rotatable shaft with one or more impellers, rotors, stirrer pins, discs, agitators, or the like, without limitation. In some preferred embodiments, the pressure vessel 12 may be maintained at a pressure between 1 and 15 bar (e.g., between 3 and 15 bar), and at a temperature between 20-150 degrees Celsius, without limitation. For improved economics, it is preferred that the pressure vessel 12 maintain a temperature less than about 130 degrees Celsius, and more preferably below 100 degrees Celsius, for example, between 20 and 80 degrees Celsius, without limitation. The pressure vessel 12 may serve to precipitate solids (e.g., a sulfate iron-containing compound or compounds) out of solution. The solids may comprise various iron+sulfate containing compounds, including, but not limited to, basic iron sulfate, jarosites, hematite, schwertmannite (e.g., $Fe_8O_8(OH)_6(SO_4).nH_2O$), and/or the like, without limitation.

Product 13 leaving the pressure vessel 12 may undergo solid-liquid separation in the downstream solid-liquid separation device 14 as shown, in order to remove the precipitated solids from the liquids fraction 11. As with the upstream solid-liquid separation device 8, separations made by the downstream solid-liquid separation device 14 may be performed using any conventional means known in the art including, but not limited to, centrifugal separation, gravity settling, filtration, sedimentation, thickening, decanting, screening, or the like, without limitation.

Solids 15 leaving the downstream solid-liquid separation device 14 may contain precipitated sulfate iron-containing solids (e.g., $Fe(OH)SO_4$, $(H_3O)Fe_3(OH)_6(SO_4)_2$, or $KFe_3(OH)_6(SO_4)_2$), without limitation. Liquids 16 leaving the downstream solid-liquid separation device 14 may be recycled back to the chloride leach circuit 5 as shown in FIG. 1. The liquids 16 may be provided directly to the reactor 6 and/or pre-combined with solids feed 2 and catalyst 4, without limitation. The liquids fraction 16 of the pressure vessel product 13 may comprise, for example, a chloride salt solution comprising ferric chloride, without limitation.

Figure 2:
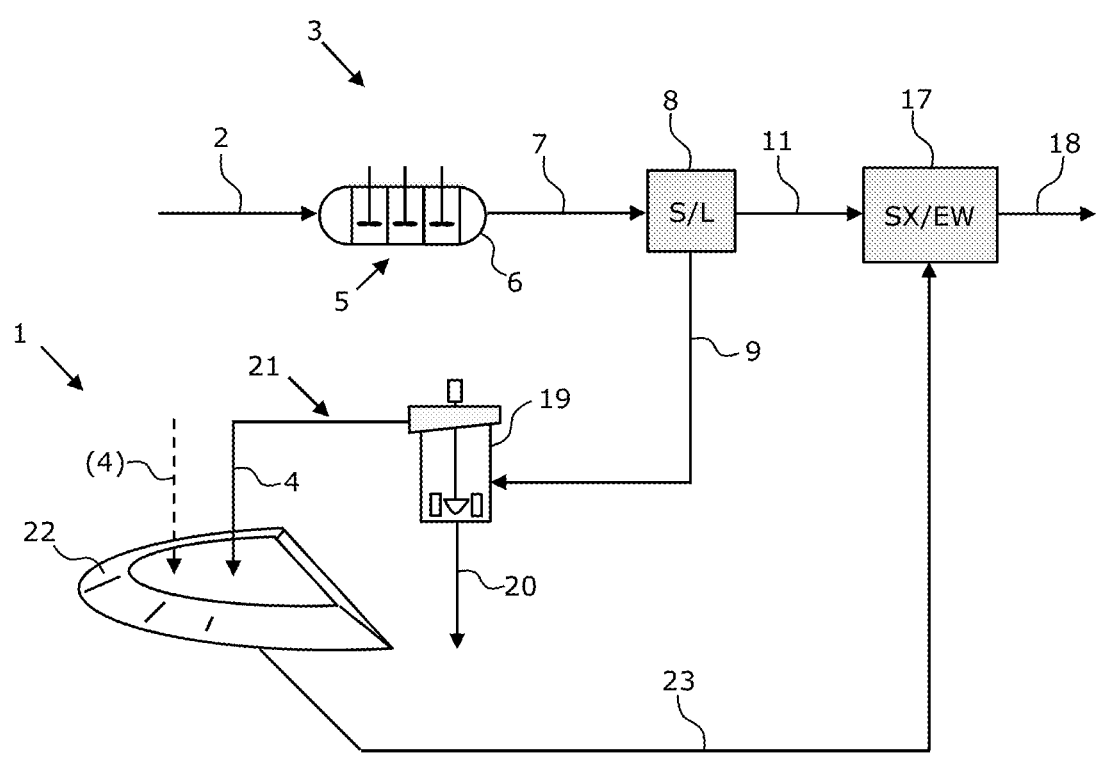
FIG. 2 depicts a system and method according to some embodiments, wherein a catalyst 4 (e.g., colloidal hematite) may be formed at elevated (e.g., over 180 degrees Celsius) or high temperatures (e.g., over 200 degrees Celsius) in a reactor 6 such as an autoclave, and then harvested from leach residue 7 by floating a solids fraction 9 of the leach residue 7. Catalyst 4 present in the froth 21 from one or more flotation cells 19 can be subsequently applied to a sulfide heap leach pad or dump leach 22, as shown, without limitation.

Turning now to FIG. 2, a novel system and method may comprise a chloride leaching circuit 5 using a reactor 6 (e.g., an autoclave) for pressure leaching a solids feed 2 containing metal sulfides. The feed 2 may comprise many different types of metal sulfides used to produce cathode 18 (e.g., copper cathode, nickel cathode, cobalt cathode, zinc cathode, silver cathode, gold cathode, etc.).

The system and method may begin with the introduction of the solids feed 2 containing metal sulfide particles into a high-temperature (e.g., above 200° C.) pressure leach circuit 3. The solids feed 2 may comprise a concentrate comprising metal sulfide particles. The metal sulfide may be refractory or double refractory, and may contain gold (Au), silver (Ag), copper, nickel, cobalt, zinc, and/or arsenic (As), without limitation. Particulates in the solids feed 2 may comprise a P80 between 5 μm and 200 μm and a P90 between 50 μm and 500 μm, without limitation. The solids feed 2 may be fed to reactor 6. The reactor 6 may comprise an autoclave or other high temperature leach vessel. The chloride leach circuit 5 may comprise sulfate, without limitation.

A solids/liquids separation 8 occurs on the leach residue 7 leaving the chloride leaching circuit 5. The solids/liquids separation 8 may occur using an upstream solid-liquid separation device 8 (which may comprise any of the apparatus described for FIG. 1). A liquids fraction 9 of the leach residue 7 may enter a solvent extraction/electrowinning circuit 17 to make cathode 18. The cathode 18 may comprise copper, silver, gold, zinc, or platinum group metal, without limitation.

A solids fraction 9 of the leach residue 7 may feed at least one flotation cell 19 (e.g., flotation circuit comprising a bank of flotation cells), without limitation. Tailings 20 (i.e., underflow) leaving the at least one flotation cell 19 may exit the circuit as waste for disposal or subsequent processing. Froth (i.e., overflow) 21 leaving the at least one flotation cell 19 may comprise a catalyst 4 (e.g., in the form of recovered $Fe_2O_3$, or hematite from reactor 6). The catalyst 4 may be delivered to a low-temperature sulfide heap leach or sulfide dump leach 22 as shown, and pregnant leach solution (PLS) 23 leaving the sulfide heap leach or sulfide dump leach 22 may feed the SX/EW circuit 17. It should be noted that an additional stream of catalyst 4 may be provided to the sulfide heap leach or sulfide dump leach 22, without limitation.

Figure 3:
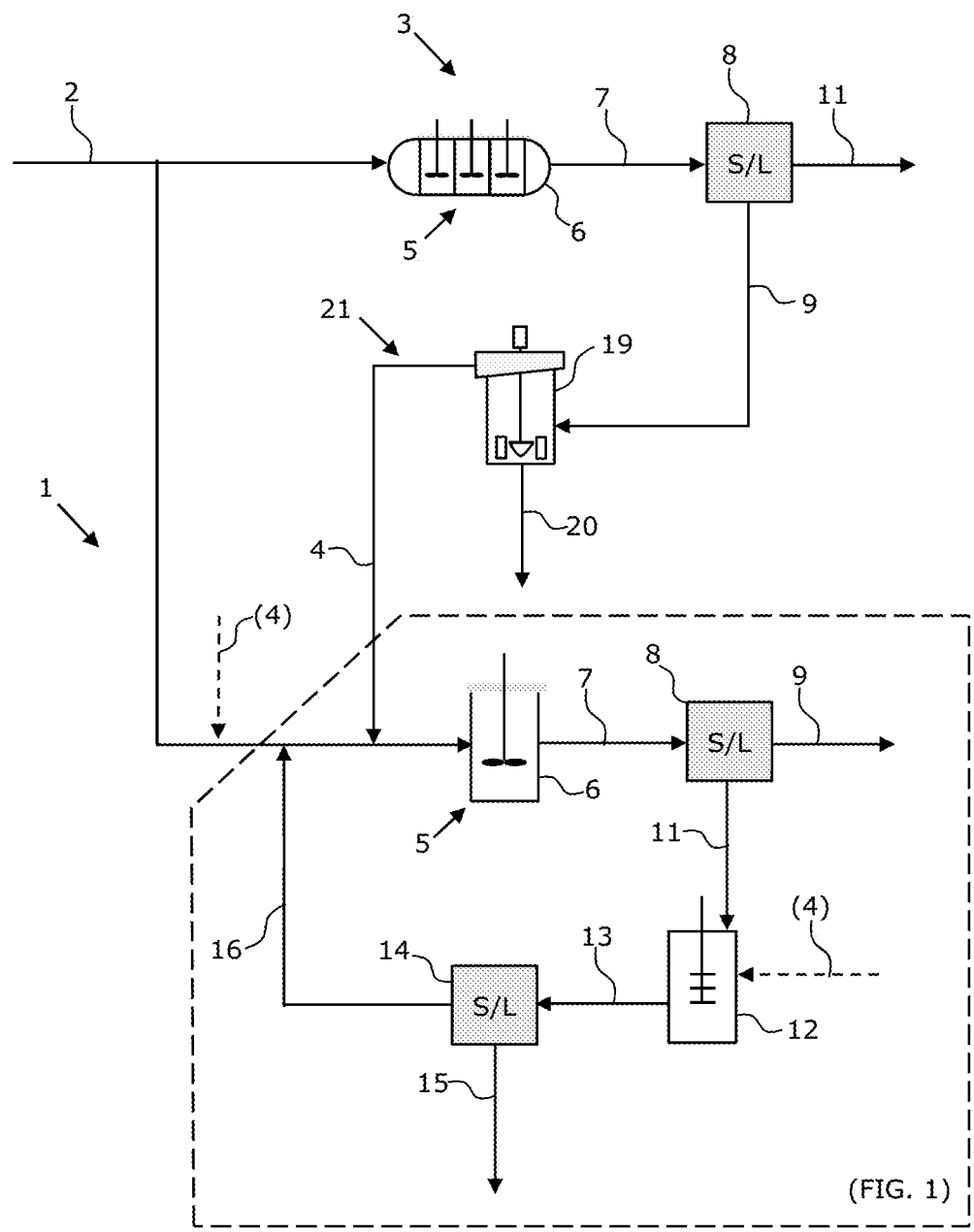
FIG. 3 depicts a system and method according to some embodiments, wherein catalyst 4 may be harvested from an elevated- or high-temperature pressure leach circuit 3 in a manner similar to what is shown in FIG. 2, and subsequently used in a lower temperature leach circuit 1, without limitation.

Turning now to FIG. 3, a catalyst 4 may be formed in an elevated- or high-temperature leach circuit 3 in the same manner as described above for FIG. 2. However, rather than supplying a heap leach or dump leach 22 with catalyst 4 derived from froth 21 as done with the embodiment shown in FIG. 2, the catalyst 4 harvested from floated solids 9 of leach residue 7 leaving a high-temperature reactor 6 may be alternatively be delivered to a lower temperature leach circuit 1 (e.g., a circuit 1 having a reactor 6 in a chloride leach circuit 5 which is maintained below 150 degrees Celsius). The lower temperature leach circuit 1 may, as shown, comprise a leach circuit as shown and described in FIG. 1. In this regard, catalyst 4 used in the embodiment shown in FIG. 1 may be derived from a high-temperature pressure leach circuit 3.

Figure 4:
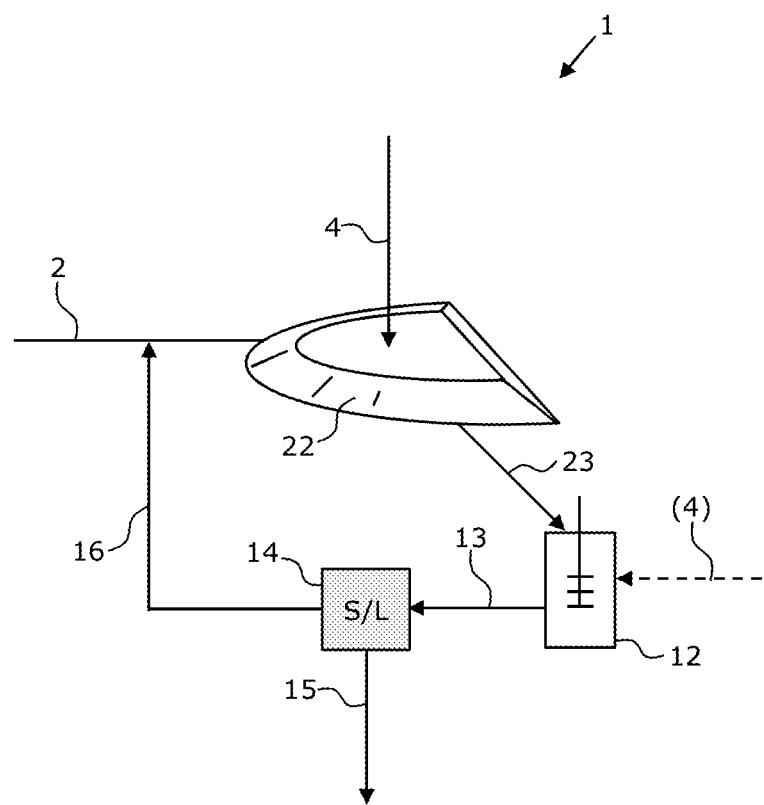
FIG. 4 depicts a system and method according to some embodiments, wherein catalyst 4 may be added to a heap leach and/or dump leach 22, without limitation. As shown, pregnant leach solution 23 from the heap leach and/or dump leach 22 may be delivered to a pressure vessel 12 which is configured to precipitate sulfate iron-containing compounds. A solid/liquid separation step 14 may be used to dewater product 13 from the pressure vessel such that sulfate iron-containing solids 15 can be removed and a chloride salt solution 16 comprising ferric chloride may be recycled to the heap/dump 22 as lixiviant.

Turning now to FIG. 4, according to some embodiments, a catalyst 4 as described herein may be provided to a sulfide heap leach or dump leach 22 (e.g., applied to a heap, pad, or pond with lixiviant, without limitation). Pregnant leach solution 23 leaving the heap leach or dump leach 22 may feed a pressure vessel 12. The pressure vessel 12 may optionally be provided with additional catalyst 4. Product leaving the pressure vessel 12 may enter a downstream solid/liquid separation device 14 as previously described. The downstream solid-liquid separation device 14 may comprise, for instance, a centrifugal separator, a gravity separator, a settling or thickening tank, a filter (e.g., a vacuum filter or pressure filter), a dewatering screw press, a sedimentation tank, decanting apparatus, screening apparatus, or the like, without limitation.

EXAMPLE 1

Several pressurized leach tests were performed to illustrate the ability of the inventive solid-state catalyst to enhance the oxidation of sulfide to sulfate and thereby minimize the production of elemental sulfur as a reaction product in metal sulfide leaching. Elemental sulfur production is especially problematic in downstream cyanide leach recovery of precious metals from refractory gold ores and concentrates thereof. This series of batch tests was conducted in a 2 L titanium Parr reactor with a refectory gold concentrate containing approximately 25 wt. % pyrite.

The leach tests were conducted in sea water with added 5 gpL Fe(III) as the chloride salt and an oxygen overpressure of 100 psig. The concentrate sample used in the tests had a P80 of approximately 110- to 120-micron and a P98 of approximately 300 micron. A solid-state catalyst (in particular, pulverized iron ore containing predominantly $Fe_2O_3$ and minor amounts of FeOOH) was mixed directly into the feed slurry. After 60 minutes residence time at operating temperature, the slurry was rapidly cooled to room temperature and filtered. The batch leach tests were conducted at 110 and 130 degrees Celsius. Unlike conventional moderate temperature leach systems (which require the use of dispersants to prevent agglomeration and passivation of liquid elemental sulfur), no liquid sulfur dispersants were used in these leach tests.

The data in FIG. 5 show that the Fe(III)-bearing catalyst had a dramatic effect of the rate of metal sulfide oxidation and conversion of sulfide to sulfate. The fact that hematite remained in the leach residue appears to confirm that it may be acting as a catalyst and that it is not simply a source of dissolved Fe(III) ion. In the test conducted at 130 degrees Celsius, the amount of hematite in the system actually increased by about 5%. In other similar tests conducted between 110 to 125 degrees Celsius, minor amounts of hematite were lost to dissolution and ranged between 5-18 wt. %. Thus, higher leach temperatures (e.g., approaching and up to 150 degrees Celsius) appear to favor the net formation of minor amounts of the catalyst. In this sense, the inventive catalysts may undergo minor dissolution with redeposition of Fe(III) and can be considered as self-healing catalysts.

EXAMPLE 2

A series of pressurized oxidation tests were conducted. The oxidation tests appeared to demonstrate the ability of the inventive solid-state catalysts to promote efficient oxidation of soluble species (e.g., Fe(II)→Fe(III), As(III)→As (V)) under acidic chloride and sulfate conditions. Those skilled in the art will understand that the oxidation rates of Fe(II) to Fe(III) in sea water systems are significantly slower than in fresh water (Ref.: F. J. Millero, "The effect of ionic interactions on the oxidation of metals in natural waters," Geochimica et Cosmochimica Acta, Vol 49, Issue 2, pp. 547-553, 1985), thus low-cost, mineral-based catalysts that can accelerate ferrous oxidation rates would especially be of value in chloride-based hydrometallurgical leach systems.

Ferrous iron, contained in sea water raffinate solutions obtained from the atmospheric pre-oxidation of refractory gold concentrates, was efficiently oxidized to ferric iron. The oxidation was done under pressurized conditions at approximately 70 degrees Celsius and at approximately 220 psig (~15 bar) oxygen overpressure in a 2 L Parr reactor for 60 min. The test results are reported in FIG. 6. Oxidation of the clear, filtered raffinate solution containing colloidal $Fe_2O_3$ at an estimated 10-100 ppm as a byproduct from the catalyzed, atmospheric, pre-oxidation of a refractory gold concentrate, produced a significant degree of conversion of Fe(II) to Fe(III). This was evidenced by direct measurement of Fe(II) concentrations as a function of time and determining the initial Fe(II) oxidation rate (Test 2). This was further evidenced by an increase in redox potential from approximately 600 mV to about 720 mV over the course of the test. This test demonstrates definitively that the inventive hematite is functioning as an oxidation catalyst which resulted in the conversion of approximately 3 g Fe(II) per L per min and not merely consumed in a reaction with acid to produce soluble ferric ions.

In contrast, a sea water raffinate, that was produced in the absence of added $Fe_2O_3$ and without added catalyst during the Fe(II) oxidation (Test 1), showed no significant ferrous to ferric conversion even at a very high $O_2$ overpressure of 455 psig. This was evidenced by the measurement of ferrous ion concentration as a function of time and confirmed by the initial and final solution redox potentials of 600 mV and about 620 mV, respectively. This series of oxidation tests illustrates the efficiency of the catalyst to promote ferrous oxidation under acidic conditions in chloride systems.

The tests also illustrate that even at wt. % amounts of 20% or less, the inventive heterogeneous catalysts can be effective under highly acidic pH conditions. The results of Tests 3 and 4 show that added catalyst concentrations as low as 400-800 ppm, to particulate-free raffinate solutions, are sufficient to accelerate ferrous oxidation rates in highly acidic sea water systems. This series of tests strongly suggest that the $Fe_2O_3$ functions as an oxidation catalyst and not merely as a potential source of dissolved Fe(III) ions.

EXAMPLE 3

Turning now, to FIG. 7, in this test, a copper sulfide concentrate containing chalcopyrite, covellite, bornite, enargite, and chalcocite, in descending order of concentration, was leached in a Parr reactor at 130° C. with an oxygen overpressure of 100 psig for 1 hour. The concentrate solids, which included 5 wt. % $Fe_2O_3$-based catalyst, were dispersed at 10 wt. % in sea water along with 5 gpL Fe(III) as ferric chloride. The P80 and P98 of the copper concentrate was approximately 86- and 208-micron, respectively.

In this test, 56% of the oxidized sulfide was converted to sulfate and only 44% was oxidized to elemental sulfur. The unexpectedly high sulfate yield can be considered to be an advantage in downstream cyanide leaching of precious metals. In contrast to other pressurized chloride leach processes (e.g., the CESL Process) where most of the sulfide is oxidized to elemental sulfur, the use of the inventive solid-state catalysts yields primarily sulfate.

The inventive catalysts are also advantageously useful in oxidizing As(III) to As(V) during the pressure leaching of arsenic-bearing metal sulfides, such as enargite, tennantite, tetrahedrite, and the like. In this test greater than 99.9% of the contained arsenic reported to the leach residue with 82% overall copper dissolution and 100% zinc dissolution. The arsenic concentration in the copper PLS was approximately 300 ppb. The co-extraction of antimony into solution was below detection by ICP-AES analysis. The lack of dissolution of As and Sb can be considered to be an advantage as these elements are undesirable contaminants in LME grade copper and are difficult to remove from acidic solution.

The mole ratio of extracted Cu to Fe reporting to the PLS was 3.2, indicating that copper is preferentially dissolved in the presence of iron-containing sulfide minerals like chalcopyrite ($CuFeS_2$) and pyrite ($FeS_2$). Furthermore, X-ray analysis of the leach residue indicates that instead of solubilizing iron from iron-bearing sulfides, iron was preferentially converted to hematite (hematite mass increased by 115%) and β-FeOOH (goethite mass increased by 1100%). This is another example of the inventive catalysts demonstrating a self-healing capability under low pH conditions where prior art suggests that jarosites are the preferred thermodynamically-stable Fe(III) bearing solid phase.

This behavior (i.e., the net removal of iron from solution during the oxidative leaching of a metal sulfide) is in apparent contradiction of the believed mechanism of sulfide leaching at moderate temperature pressure oxidation systems wherein dissolved ferric is believed to catalyze the mineral dissolution which "is regenerated by homogeneous reactions with dissolved oxygen" (Ref: E. Peters, "Hydrometallurgical process innovation,", Hydrometallurgy, 29, p. 441 (1992)). The results further suggest that the inventive catalyst surface can participate directly in the oxidative dissolution of metal sulfides.

The quantitative dissolution of sphalerite (ZnS) in the presence of the inventive solid-state catalyst at a temperature of 130 degrees Celsius is notable. It is generally known that the extraction of zinc at reduced temperatures (e.g., below 150 degrees Celsius) is inhibited by the production of elemental sulfur which passivates the surface of the reacting mineral particle. Even with extended leaching times it is not possible to achieve zinc recoveries in excess of about 70-75% (Ref.: F. Forward and H. Veltman, "Direct leaching of zinc sulphide concentrates by Sherritt Gordon," J. Metals, 12, pp. 836-840, 1961). In this particular inventive embodiment, 100% zinc extraction was achieved within 60 minutes at 130 degrees Celsius without added surfactants for sulfur dispersion.

The performance of the inventive system and method is contrasted with the CESL process (e.g., which is performed at a temperature around 150° C. with quebracho as sulfur dispersant), wherein arsenic and copper extraction into solution was 68.1 and 93.4%, respectively for a copper concentrate feed with a 60 micron P80.

The time required to reach 90% copper extraction was 150 minutes. Co-extraction of antimony into solution was 46.9%. (ref: F. Parada and I. Wilkomirsky, "Pressure Leaching of a High Arsenic Copper Concentrate Under CESL Process Conditions," COM 2014, ISBN: 078-1-926872-24-7). A comparative summary of leach performance for arsenic containing copper concentrates is given in the table of FIG. 7.

In the absence of the inventive catalysts, acidic ferric sulfate pressure leach systems (e.g., Gibraltar, FIG. 5) show poor dissolution of copper from chalcopyrite at temperatures below about 180 degrees Celsius (i.e., at low- to moderate-leach temperatures). In addition, the mole ratio of extracted Cu/Fe is considerably lower (i.e., 0.8) than in the inventive method (i.e., 3.2).

COMPARATIVE EXAMPLE

In the absence of an elemental sulfur dispersant, chalcopyrite concentrates are known to leach poorly, even with ultra-fine grinding prior to pressure oxidation. A chalcopyrite concentrate (Gilbraltar) with a P90 of 38 micron yielded only 43% copper dissolution after 3 hours leach residence time at 130 degrees Celsius and 100 psi oxygen overpressure (ref: R. Hackl, "The Leaching and Passivation of Chalcopyrite in Acid Sulfate Media," Ph.D. thesis, The University of British Columbia, November 1995, pp. 94-95).

Embodiments of the inventive system/method may produce significantly greater copper dissolution in one-third of the reaction time with considerably coarser feed particle size. The results are compared in the table found in FIG. 8.

Where used herein, the term "reactor" may comprise a stirred tank reactor, a column reactor, an autoclave, a mixer, or other vessel (agitated or not) which is suitably configured for performing a leaching step, without limitation.

Those skilled in the art will understand that finer particle sizes for solids feed 2 will likely result in faster particle dissolution kinetics and increased metal recoveries in similar or shorter reaction times.

It should be known that the specific features, process steps, and possible benefits shown and described herein in detail are purely exemplary in nature and should not limit the scope of the invention. Moreover, although the invention has been described in terms of particular embodiments and applications, one of ordinary skill in the art, in light of these teachings, can generate additional embodiments and modifications without departing from the spirit of or exceeding the scope of the claimed invention.

Accordingly, it is to be understood that the drawings and descriptions herein are proffered by way of example to facilitate comprehension of the invention and should not be construed to limit the scope thereof.

REFERENCE TO ENUMERATED ELEMENTS IN THE DRAWINGS

1. Low- to moderate-temperature metal sulfide leach circuit
2. Solids feed containing metal sulfide particles (e.g., concentrate, refractory gold ore particles)
3. Elevated- or high-temperature metal sulfide leach circuit
4. Iron-containing catalyst (e.g., 10 ppm to 20 wt. % of solids feed)
(4). Optional iron-containing catalyst
5. Chloride (and/or sulfate) leach circuit
6. Reactor (e.g., stirred tank reactor, column reactor, autoclave, mixer, or the like)
7. Leach residue
8. Upstream solid-liquid separation device
9. Solids fraction of leach residue
10. Cyanide leach circuit (e.g., for gold recovery)
11. Liquids fraction of leach residue
12. Pressure vessel (e.g., 1-15 bar, 20-150° C., and more preferably 40-80° C.)
13. Product of pressure vessel
14. Downstream solid-liquid separation device
15. Solids fraction (e.g., precipitate comprising a sulfate iron-containing compound; e.g., $Fe(OH)SO_4$ or $Fe(OH)_3$)
16. Liquids fraction (e.g., a chloride slat solution comprising ferric chloride)
17. Solvent extraction and electrowinning circuit
18. Cathode
19. At least one flotation cell (e.g., flotation circuit comprising a bank of flotation cells)
20. Tailings for disposal
21. Froth comprising a catalyst 4 (e.g., hematite recovered from reactor 6)
22. Sulfide heap leach or sulfide dump leach
23. Pregnant leach solution (PLS)

What is claimed is:

1. A method for removing a sulfate iron-containing compound from a metal sulfide leaching circuit (1) comprising:
   providing a reactor (6) within a chloride leach circuit (5);
   providing a pressure vessel (12) downstream of the reactor (6);
   providing an upstream solid/liquid separation device (8) between the reactor (6) and the pressure vessel (12);
   providing a solids feed (2) containing metal sulfide particles to the reactor (6);
   leaching the metal sulfide particles in the reactor (6);
   dewatering leach residue (7) leaving the chloride leach circuit (5) using the upstream solid/liquid separation device (8);
   providing a downstream solid/liquid separation device (14) downstream of the pressure vessel (12) for receiving product (13) leaving the pressure vessel (12);
   precipitating a sulfate iron-containing compound out of solution in the pressure vessel (12);
   removing said sulfate iron-containing compound using the downstream solid/liquid separation device (14);
   providing a catalyst (4) comprising a material selected from the group consisting of: colloidal hematite, colloidal goethite, particulate containing FeOOH, particulate containing $\alpha$-FeOOH, particulate containing $\gamma$-FeOOH, particulate containing $Fe_2O_3$, particulate containing $\alpha$-$Fe_2O_3$, particulate containing $\gamma$-$Fe_2O_3$, particulate containing $Fe_3O_4$, particulate containing $Fe(OH)SO_4$, and a combination thereof;
   providing the catalyst (4) to the reactor (6); and
   optionally providing the catalyst (4) to the pressure vessel (12).

2. The method according to claim 1, further comprising maintaining the reactor (6) at a temperature between 20 and 150 degrees Celsius.

3. The method according to claim 1, further comprising maintaining the reactor (6) at a temperature between 20 and 100 degrees Celsius and maintaining the reactor (6) at atmospheric pressure.

4. The method according to claim 1, further comprising maintaining the reactor (6) at a temperature between 40 and 150 degrees Celsius and maintaining the reactor (6) at above-atmospheric pressure.

5. The method according to claim 1, wherein the catalyst (4) is a solid-state catalyst.

6. The method according to claim 1, wherein the metal sulfide particles of the solids feed (2) comprise pyrite, pyrrhotite, and/or marcasite.

7. The method according to claim 1, further comprising delivering a liquids fraction (16) from the downstream solid/liquid separation device (14) to the reactor (6); wherein the liquids fraction (16) comprises a chloride salt solution comprising ferric chloride.

8. The method according to claim 1, further comprising leaching a solids fraction (9) of the leach residue (7) from the chloride leach circuit (5), in a cyanide leach circuit (10), to recover a precious metal therefrom.

9. The method according to claim 8, wherein the precious metal is selected from the group consisting of: gold, silver, a platinum group metal, and a combination thereof.

10. The method according to claim 1, further comprising delivering a liquids fraction (11) of the leach residue (7) from the chloride leach circuit (5), to the pressurized vessel (12).

11. The method according to claim 1, further comprising maintaining the pressurized vessel (12) at a pressure between 1 and 15 bar.

12. The method according to claim 1, further comprising the step of doping material of the catalyst (4) with $Al^{3+}$, $Ti^{3+}$, or a combination thereof.

13. The method according to claim 1, wherein the catalyst (4) is colloidal and the method further comprises supporting the material of the catalyst (4) on a particle or particulate.

14. The method according to claim 1, further comprising binding the catalyst (4) to a surface of a component within the reactor (6) and/or the pressure vessel (12); or forming a porous or non-porous film or coating comprising the catalyst (4) on a surface of a component within the reactor (6) and/or the pressure vessel (12).

15. The method according to claim 1, further comprising promoting high oxidation and promoting one of the following in the reactor (6): rapid conversion of sulfide to sulfate; rapid conversion of arsenic III to arsenic V.

16. The method according to claim 1, further comprising promoting rapid conversion of ferrous to ferric in the pressure vessel (12).

17. The method according to claim 1, further comprising mitigating froth formation in the leach reactor (6) by virtue of the steps of: providing the catalyst (4) to the reactor (6) and optionally providing the catalyst (4) to the pressure vessel (12).

18. The method according to claim 1, wherein the metal sulfide particles in the solids feed (2) comprises sphalerite, the method comprising leaching zinc (Zn) into solution in the reactor (6).

\* \* \* \* \*